(12) United States Patent
Votaw et al.

(10) Patent No.: US 10,158,629 B2
(45) Date of Patent: *Dec. 18, 2018

(54) PREVENTING UNAUTHORIZED ACCESS TO SECURED INFORMATION SYSTEMS USING MULTI-DEVICE AUTHENTICATION TECHNIQUES

(71) Applicant: Bank of America Corporation, Charlotte, NC (US)

(72) Inventors: Elizabeth S. Votaw, Potomac, MD (US); Andrew T. Keys, Albany, OR (US); Ashish Arora, Bellevue, WA (US)

(73) Assignee: Bank of America Corporation, Charlotte, NC (US)

( * ) Notice: Subject to any disclaimer, the term of this patent is extended or adjusted under 35 U.S.C. 154(b) by 264 days.

This patent is subject to a terminal disclaimer.

(21) Appl. No.: 15/187,294

(22) Filed: Jun. 20, 2016

(65) Prior Publication Data
US 2017/0366540 A1    Dec. 21, 2017

(51) Int. Cl.
*H04L 29/06* (2006.01)
*G06Q 40/02* (2012.01)
*G06Q 20/40* (2012.01)

(52) U.S. Cl.
CPC ... *H04L 63/0838* (2013.01); *G06Q 20/40145* (2013.01); *G06Q 40/02* (2013.01); *H04L 63/0853* (2013.01); *H04L 63/0861* (2013.01)

(58) Field of Classification Search
CPC .............. H04L 63/0838; H04L 63/123; H04L 63/0861; H04L 67/02; G06Q 40/02

USPC .......................................................... 726/6
See application file for complete search history.

(56) References Cited

U.S. PATENT DOCUMENTS

| | | |
|---|---|---|
| 2014/0181893 A1* | 6/2014 | Von Bokern ........ H04L 63/0838 726/1 |
| 2016/0112410 A1 | 4/2016 | Nedeltchev et al. |
| 2016/0112412 A1 | 4/2016 | Roth et al. |
| 2016/0112430 A1 | 4/2016 | Geller |
| 2016/0112437 A1 | 4/2016 | Churyumov |
| 2016/0112453 A1 | 4/2016 | Martinez et al. |
| 2016/0112497 A1 | 4/2016 | Koushik et al. |
| 2016/0112872 A1 | 4/2016 | McClement et al. |
| 2016/0117697 A1 | 4/2016 | Briere et al. |

(Continued)

*Primary Examiner* — Evans Desrosiers
(74) *Attorney, Agent, or Firm* — Banner & Witcoff, Ltd.; Michael A. Springs

(57) ABSTRACT

A computing platform may receive, from a client portal server, a request to authenticate a user to a user account associated with a client portal provided by the client portal server, as well as device selection input selecting a first registered device and a second registered device to receive one-time passcodes. The computing platform may generate a first one-time passcode for the first registered device and a second one-time passcode for the second registered device, and may send the first one-time passcode to the first registered device and the second one-time passcode to the second registered device. The computing platform may receive and validate one-time passcode input. Based on validating the one-time passcode input, the computing platform may generate a validation message directing the client portal server to provide the user with access to the user account, and may send the validation message to the client portal server.

18 Claims, 15 Drawing Sheets

(56) References Cited

U.S. PATENT DOCUMENTS

| | | |
|---|---|---|
| 2016/0119379 A1 | 4/2016 | Nadkarni |
| 2016/0119746 A1 | 4/2016 | Moldaysky et al. |
| 2016/0119749 A1 | 4/2016 | Moldaysky et al. |
| 2016/0119750 A1 | 4/2016 | Moldaysky et al. |
| 2016/0119771 A1 | 4/2016 | Moldavsky et al. |
| 2016/0124742 A1 | 5/2016 | Rangasamy et al. |
| 2016/0125184 A1 | 5/2016 | Mahaffey et al. |
| 2016/0125358 A1 | 5/2016 | Kushner et al. |
| 2016/0125386 A1 | 5/2016 | Desai et al. |
| 2016/0125394 A1 | 5/2016 | Desai et al. |
| 2016/0125408 A1 | 5/2016 | Crawford |
| 2016/0125414 A1 | 5/2016 | Desai et al. |
| 2016/0127254 A1 | 5/2016 | Kumar et al. |
| 2016/0127324 A1 | 5/2016 | Ferdinand |
| 2016/0127454 A1 | 5/2016 | Maheshwari et al. |
| 2016/0127539 A1 | 5/2016 | Sharma |
| 2016/0127540 A1 | 5/2016 | Sharma et al. |
| 2016/0127541 A1 | 5/2016 | Sharma |
| 2016/0127548 A1 | 5/2016 | Sharma |
| 2016/0127549 A1 | 5/2016 | Sharma |
| 2016/0127562 A1 | 5/2016 | Chauhan |
| 2016/0127566 A1 | 5/2016 | Sharma et al. |
| 2016/0127567 A1 | 5/2016 | Kimmel |
| 2016/0127569 A1 | 5/2016 | Kamas et al. |
| 2016/0127797 A1 | 5/2016 | Ellis et al. |
| 2016/0127808 A1 | 5/2016 | Wong et al. |
| 2016/0132221 A1 | 5/2016 | Lasser et al. |
| 2016/0132401 A1 | 5/2016 | O'Hare et al. |
| 2016/0132585 A1 | 5/2016 | Aasen et al. |
| 2016/0134599 A1 | 5/2016 | Ross et al. |
| 2016/0134634 A1 | 5/2016 | Rosendal et al. |
| 2016/0140329 A1 | 5/2016 | Boivie |
| 2016/0140582 A1 | 5/2016 | Steele et al. |
| 2016/0147952 A1 | 5/2016 | Garcia et al. |
| 2016/0148597 A1 | 5/2016 | Hamid et al. |
| 2016/0149705 A1 | 5/2016 | Bobinski et al. |
| 2016/0149843 A1 | 5/2016 | Spicer et al. |
| 2016/0149893 A1 | 5/2016 | Perrot |
| 2016/0150078 A1 | 5/2016 | Joshi et al. |
| 2016/0155195 A1 | 6/2016 | Imrey |
| 2016/0156627 A1 | 6/2016 | Wallaja |
| 2016/0156666 A1 | 6/2016 | Rajagopal et al. |
| 2016/0182500 A1* | 6/2016 | Ligatti ............... H04L 63/0853 713/156 |

\* cited by examiner

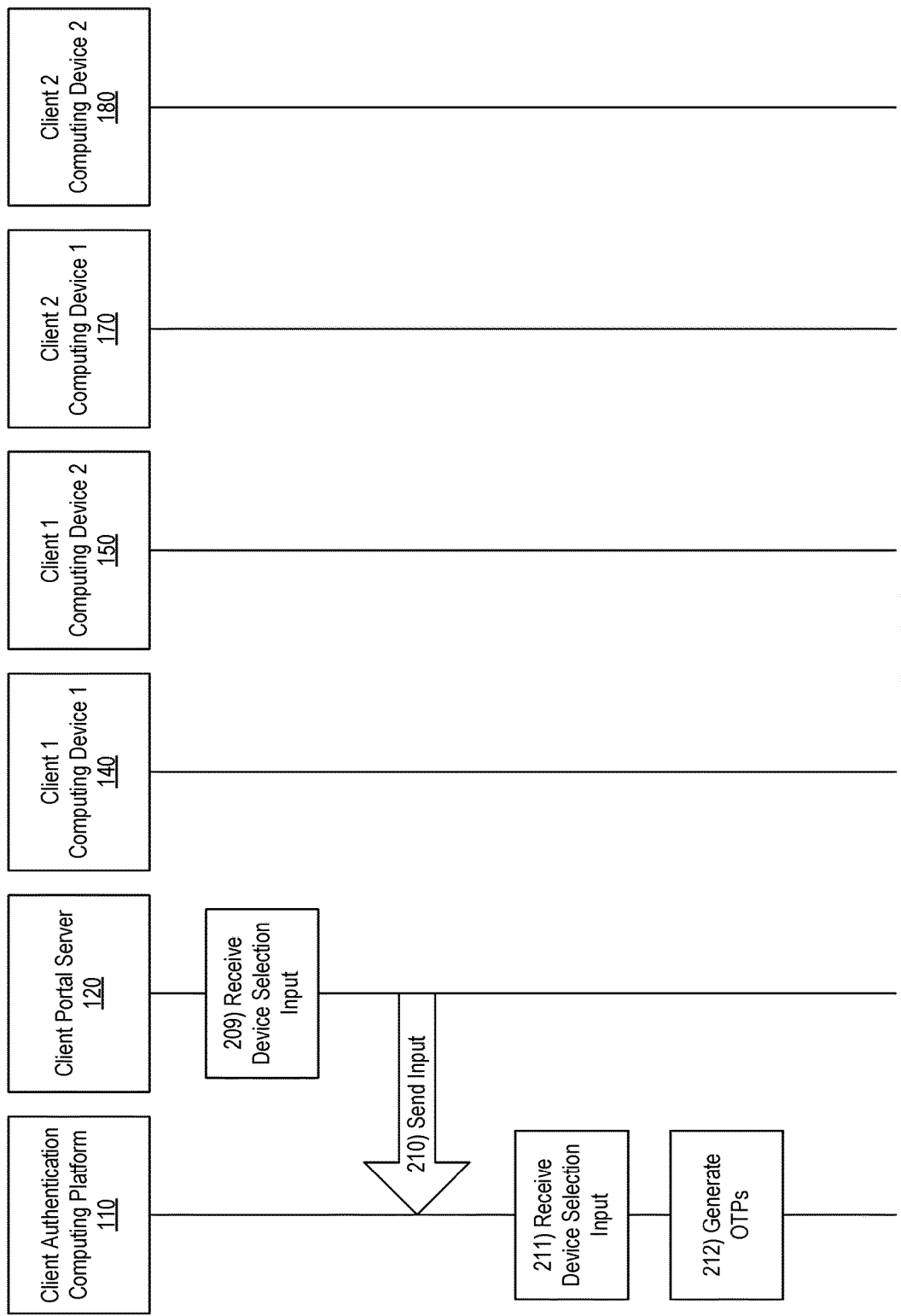

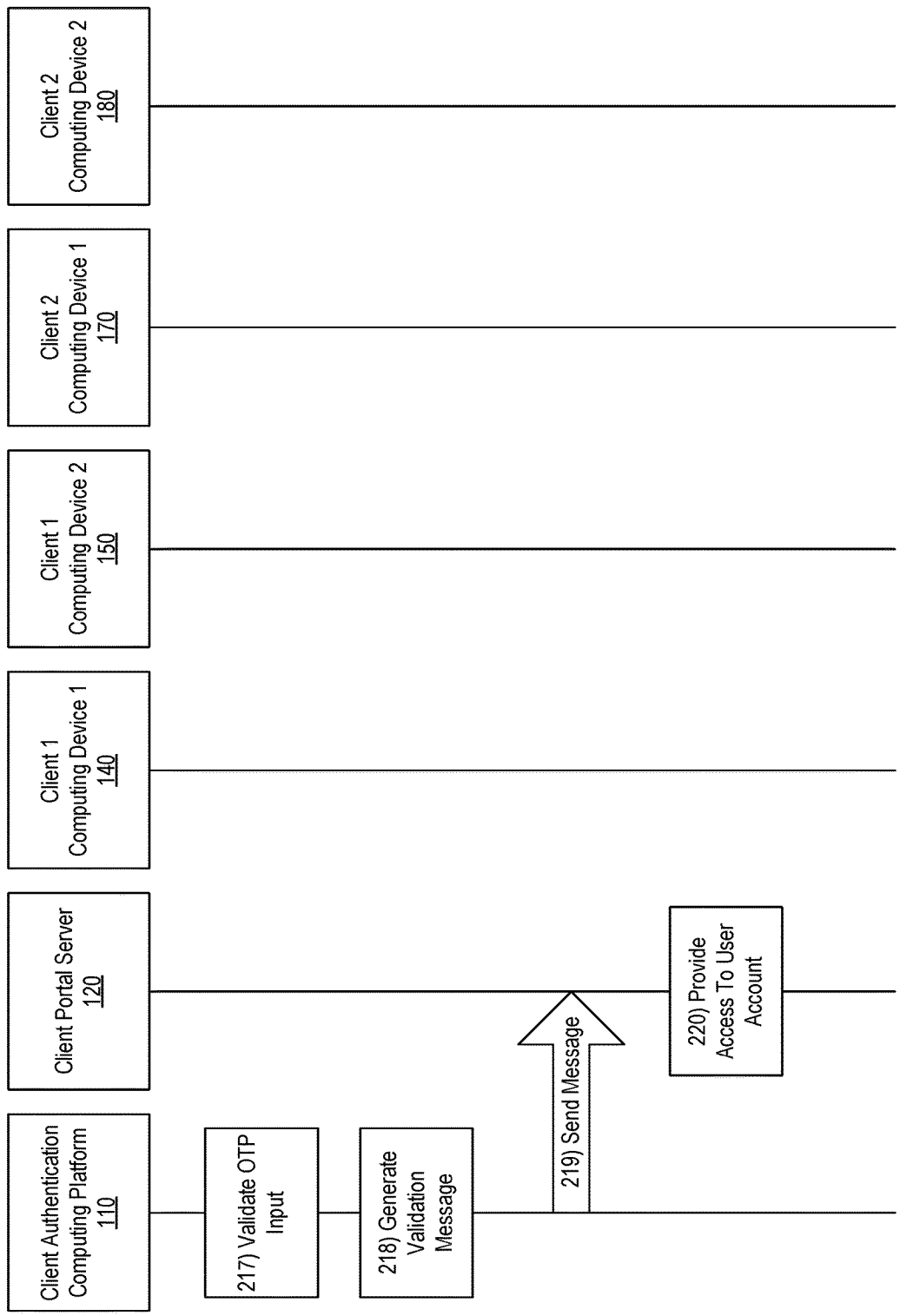

Client Portal

Hello <First1 Last1>! Thank you for visiting us.

We have received your request to access your user account.

To continue authenticating, please select at least two of your registered devices to receive one-time passcodes:

[ ] Device 1 – "My Smart Phone"
[ ] Device 2 – "My Mobile Tablet"
[ ] Device 3 – "My Smart Watch"

| *Help* | *Next* |

Client Portal
*<First1 Last1>*

We have sent one-time passcodes to your selected devices. Please enter these passcodes in the fields below to continue:

OTP1: _____

OTP2: _____

| *Help* | *Next* |

Client Portal

Hello <First2 Last2>! Thank you for visiting us.

We have received your request to access your user account.

To continue authenticating, please select at least two of your registered devices to receive one-time passcodes:

[ ] Device 1 – "My Personal Phone"
[ ] Device 2 – "My Work Phone"
[ ] Device 3 – "My Mobile Tablet"

| Help | Next |

FIG. 5

Client Portal
*<First2 Last2>*

We have sent one-time passcodes to your selected devices. Please enter these passcodes in the fields below to continue:

OTP1: _____

OTP2: _____

| Help | Next |

FIG. 6

PREVENTING UNAUTHORIZED ACCESS TO SECURED INFORMATION SYSTEMS USING MULTI-DEVICE AUTHENTICATION TECHNIQUES

BACKGROUND

Aspects of the disclosure relate to providing information security and preventing unauthorized access to resources of an information system. In particular, one or more aspects of the disclosure relate to preventing unauthorized access to secured information systems using multi-device authentication techniques.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by implementing multi-device authentication techniques.

In accordance with one or more embodiments, a computing platform having at least one processor, a memory, and a communication interface may receive, via the communication interface, and from a client portal server, a request to authenticate a first user to a first user account associated with a client portal provided by the client portal server. In addition, the computing platform may receive, via the communication interface, and from the client portal server, first device selection input selecting a first registered device and a second registered device to receive one-time passcodes. Subsequently, the computing platform may generate a first one-time passcode for the first registered device and a second one-time passcode for the second registered device. The computing platform may send, via the communication interface, the first one-time passcode to the first registered device and the second one-time passcode to the second registered device. Thereafter, the computing platform may receive, via the communication interface, and from the client portal server, first one-time passcode input. The computing platform may validate the first one-time passcode input received from the client portal server. Based on validating the first one-time passcode input received from the client portal server, the computing platform may generate a first validation message directing the client portal server to provide the first user with access to the first user account. Subsequently, the computing platform may send, via the communication interface, to the client portal server, the first validation message directing the client portal server to provide the first user with access to the first user account.

In some embodiments, prior to receiving the request to authenticate the first user to the first user account associated with the client portal provided by the client portal server, the computing platform may receive first device registration information for the first user account associated with the client portal provided by the client portal server. In addition, the computing platform may store the first device registration information for the first user account associated with the client portal provided by the client portal server. The first device registration information may identify the first registered device, the second registered device, and a third registered device as authorized passcode recipients for the first user account associated with the client portal provided by the client portal server.

In some embodiments, in response to receiving the request to authenticate the first user to the first user account associated with the client portal provided by the client portal server, the computing platform may generate a first device selection prompt directing the client portal server to prompt the first user to select at least two devices to receive the one-time passcodes. In addition, the computing platform may send, via the communication interface, and to the client portal server, the first device selection prompt directing the client portal server to prompt the first user to select the at least two devices to receive the one-time passcodes.

In some instances, prior to generating the first validation message directing the client portal server to provide the first user with access to the first user account, the computing platform may receive input selecting a third registered device associated with the first user account to receive an authentication prompt, and the computing platform may generate and send a registered-device authentication prompt to the third registered device associated with the first user account. In some instances, the registered-device authentication prompt generated and sent to the third registered device associated with the first user account may include a biometric authentication prompt.

In some embodiments, the computing platform may receive, via the communication interface, and from the client portal server, a request to authenticate a second user to a second user account associated with the client portal provided by the client portal server. In addition, the computing platform may receive, via the communication interface, and from the client portal server, second device selection input selecting a third registered device and a fourth registered device to receive one-time passcodes. Subsequently, the computing platform may generate a third one-time passcode for the third registered device and a fourth one-time passcode for the fourth registered device. The computing platform may send, via the communication interface, the third one-time passcode to the third registered device and the fourth one-time passcode to the fourth registered device. Thereafter, the computing platform may receive, via the communication interface, and from the client portal server, second one-time passcode input. The computing platform may validate the second one-time passcode input received from the client portal server. Based on validating the second one-time passcode input received from the client portal server, the computing platform may generate a second validation message directing the client portal server to provide the second user with access to the second user account. Subsequently, the computing platform may send, via the communication interface, to the client portal server, the second validation message directing the client portal server to provide the second user with access to the second user account.

In some instances, prior to receiving the request to authenticate the second user to the second user account associated with the client portal provided by the client portal server, the computing platform may receive second device registration information for the second user account associated with the client portal provided by the client portal server. In addition, the computing platform may store the second device registration information for the second user account associated with the client portal provided by the client portal server. The second device registration information may identify the third registered device, the fourth registered device, and a fifth registered device as authorized passcode recipients for the second user account associated with the client portal provided by the client portal server.

In some instances, in response to receiving the request to authenticate the second user to the second user account associated with the client portal provided by the client portal server, the computing platform may generate a second device selection prompt directing the client portal server to prompt the second user to select at least two devices to receive the one-time passcodes. In addition, the computing platform may send, via the communication interface, and to the client portal server, the second device selection prompt directing the client portal server to prompt the second user to select the at least two devices to receive the one-time passcodes.

In some instances, prior to generating the second validation message directing the client portal server to provide the second user with access to the second user account, the computing platform may receive input selecting a fifth registered device associated with the second user account to receive an authentication prompt, and the computing platform may generate and send a registered-device authentication prompt to the fifth registered device associated with the second user account. In some instances, the registered-device authentication prompt generated and sent to the fifth registered device associated with the second user account may include a biometric authentication prompt.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for preventing unauthorized access to secured information systems using multi-device authentication techniques in accordance with one or more example embodiments;

FIGS. 3-6 depict example graphical user interfaces for preventing unauthorized access to secured information systems using multi-device authentication techniques in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosure relate to using multi-device one-time passcode authentication with choose-your-own-challenge techniques. For example, when authenticating an individual customer, an authentication server may prompt a server to select a registered device, from a plurality of registered devices, to which a one-time passcode may be sent. In some instances, a plurality of one-time passcodes may be sent to a plurality of registered devices associated with an individual customer to authenticate the customer to a single online banking or mobile banking session.

Figure 1A:
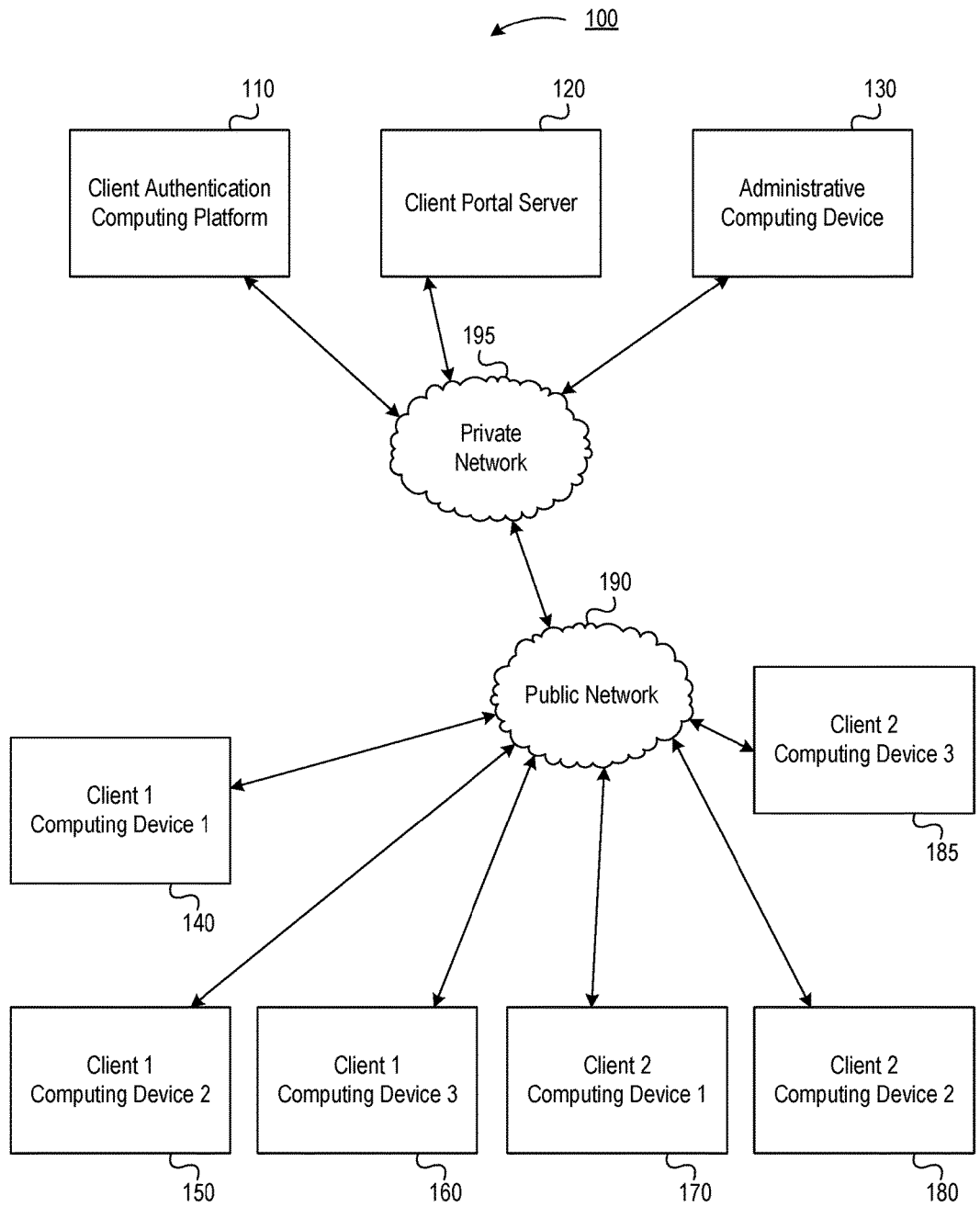
FIGS. 1A and 1B depict an illustrative computing environment for preventing unauthorized access to secured information systems using multi-device authentication techniques in accordance with one or more example embodiments.
Figure 1B:
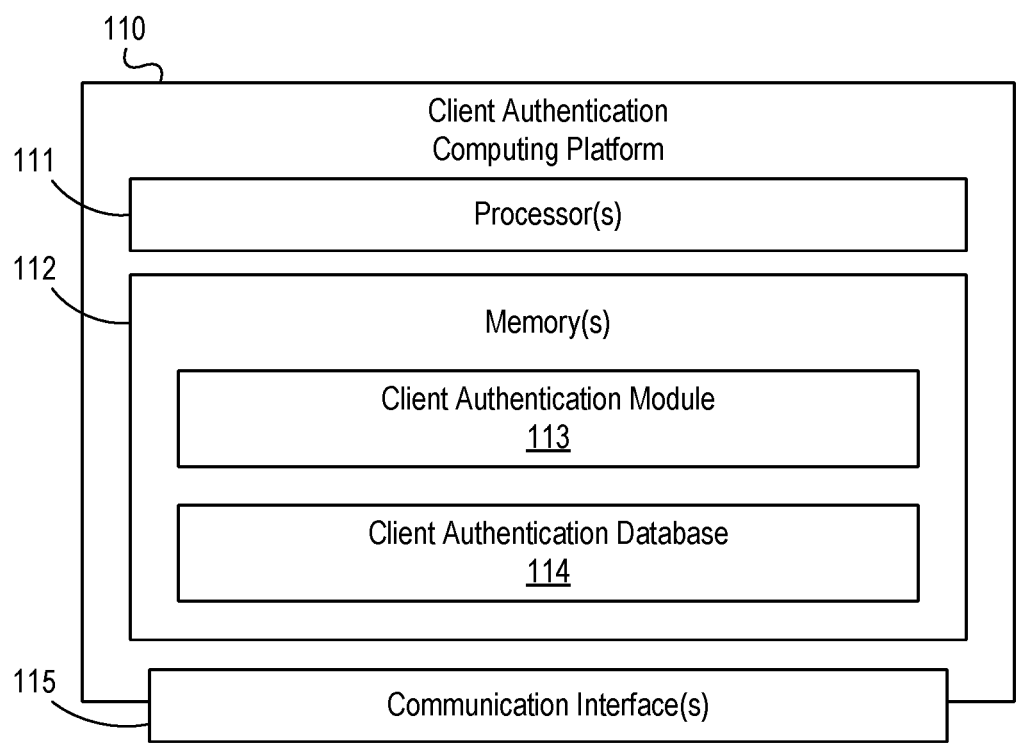

FIGS. 1A and 1B depict an illustrative computing environment for preventing unauthorized access to secured information systems using multi-device authentication techniques in accordance with one or more example embodiments. Referring to FIG. 1A, computing environment 100 may include one or more computing devices. For example, computing environment 100 may include a client portal server 120, an administrative computing device 130, a first client computing device 140, a second client computing device 150, a third client computing device 160, a fourth client computing device 170, a fifth client computing device 180, and a sixth client computing device 185.

Client portal server 120 may be configured to provide one or more portal interfaces to one or more client devices. For example, client portal server 120 may be configured to provide a customer portal, such as an online banking portal, to one or more customers of an organization, such as a financial institution, who may use one or more client computing devices to access the portal, such as client computing device 140, client computing device 150, client computing device 160, client computing device 170, client computing device 180, and client computing device 185, as illustrated in greater detail below. In some instances, in addition to being configured to provide an online banking portal associated with a financial institution to one or more customers of the financial institution and/or their associated computing devices, client portal server 120 also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Administrative computing device 130 may be configured to provide one or more interfaces that allow for configuration and management of one or more other computing devices and/or computer systems included in computing environment 100. Client computing device 140 may be configured to be used by a first customer of an organization, such as a financial institution. Client computing device 150 and client computing device 160 also may be configured to be used by the first customer of the organization. In some instances, client computing device 140, client computing device 150, and client computing device 160 may, for example, be registered with the organization and/or one or more computer systems in computing environment 100, such that the organization and/or the one or more computer systems maintain one or more records linking client computing device 140, client computing device 150, and client computing device 160 to the first customer of the organization, as discussed in greater detail below. Client computing device 170 may be configured to be used by a second customer of the organization (who may, e.g., be different from the first customer of the organization). Client computing device 180 and client computing device 185 also may be configured to be used by the second customer of the organization. In some instances, client computing device 170, client computing device 180, and client computing device 185 may, for example, be registered with the organization and/or one or more computer systems in computing environment 100, such that the organization and/or the one or more computer systems maintain one or more records linking client computing device 170, client computing device 180, and client computing device 185 to the second customer of the organization, as discussed in greater detail below.

In one or more arrangements, client portal server 120, administrative computing device 130, client computing device 140, client computing device 150, client computing device 160, client computing device 170, client computing device 180, and client computing device 185 may be any type of computing device capable of receiving a user interface, receiving input via the user interface, and communicating the received input to one or more other computing devices. For example, client portal server 120, administrative computing device 130, client computing device 140, client computing device 150, client computing device 160, client computing device 170, client computing device 180, and client computing device 185 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client portal server 120, administrative computing device 130, client computing device 140, client computing device 150, client computing device 160, client computing device 170, client computing device 180, and client computing device 185 may, in some instances, be special-purpose computing devices configured to perform specific functions.

Computing environment 100 also may include one or more computing platforms. For example, computing environment 100 may include client authentication computing platform 110. As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Computing environment 100 also may include one or more networks, which may interconnect one or more of client authentication computing platform 110, client portal server 120, administrative computing device 130, client computing device 140, client computing device 150, client computing device 160, client computing device 170, client computing device 180, and client computing device 185. For example, computing environment 100 may include public network 190 and private network 195. Private network 195 and/or public network 190 may include one or more sub-networks (e.g., local area networks (LANs), wide area networks (WANs), or the like). Private network 195 may be associated with a particular organization (e.g., a corporation, financial institution, educational institution, governmental institution, or the like) and may interconnect one or more computing devices associated with the organization. For example, client authentication computing platform 110, client portal server 120, and administrative computing device 130 may be associated with an organization (e.g., a financial institution), and private network 195 may be associated with and/or operated by the organization, and may include one or more networks (e.g., LANs, WANs, virtual private networks (VPNs), or the like) that interconnect client authentication computing platform 110, client portal server 120, and administrative computing device 130 and one or more other computing devices and/or computer systems that are used by, operated by, and/or otherwise associated with the organization. Public network 190 may connect private network 195 and/or one or more computing devices connected thereto (e.g., client authentication computing platform 110, client portal server 120, and administrative computing device 130) with one or more networks and/or computing devices that are not associated with the organization. For example, client computing device 140, client computing device 150, client computing device 160, client computing device 170, client computing device 180, and client computing device 185 might not be associated with an organization that operates private network 195 (e.g., because client computing device 140, client computing device 150, client computing device 160, client computing device 170, client computing device 180, and client computing device 185 may be owned, operated, and/or serviced by one or more entities different from the organization that operates private network 195, such as one or more customers of the organization and/or vendors of the organization, rather than being owned and/or operated by the organization itself or an employee or affiliate of the organization), and public network 190 may include one or more networks (e.g., the internet) that connect client computing device 140, client computing device 150, client computing device 160, client computing device 170, client computing device 180, and client computing device 185 to private network 195 and/or one or more computing devices connected thereto (e.g., client authentication computing platform 110, client portal server 120, and administrative computing device 130).

Referring to FIG. 1B, client authentication computing platform 110 may include one or more processors 111, memory 112, and communication interface 115. A data bus may interconnect processor(s) 111, memory 112, and communication interface 115. Communication interface 115 may be a network interface configured to support communication between client authentication computing platform 110 and one or more networks (e.g., private network 195, public network 190, or the like). Memory 112 may include one or more program modules having instructions that when executed by processor(s) 111 cause client authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 113 and a client authentication database 114. Client authentication module 113 may have instructions that direct and/or cause client authentication computing platform 110 to authenticate one or more users and/or devices using multi-device authentication techniques and/or to perform other functions, as discussed in greater detail below. Client authentication database 114 may store information used by client authentication module 113 and/or client authentication computing platform 110 in authenticating one or more users and/or devices using multi-device authentication techniques and/or in performing other functions.

Figure 2A:
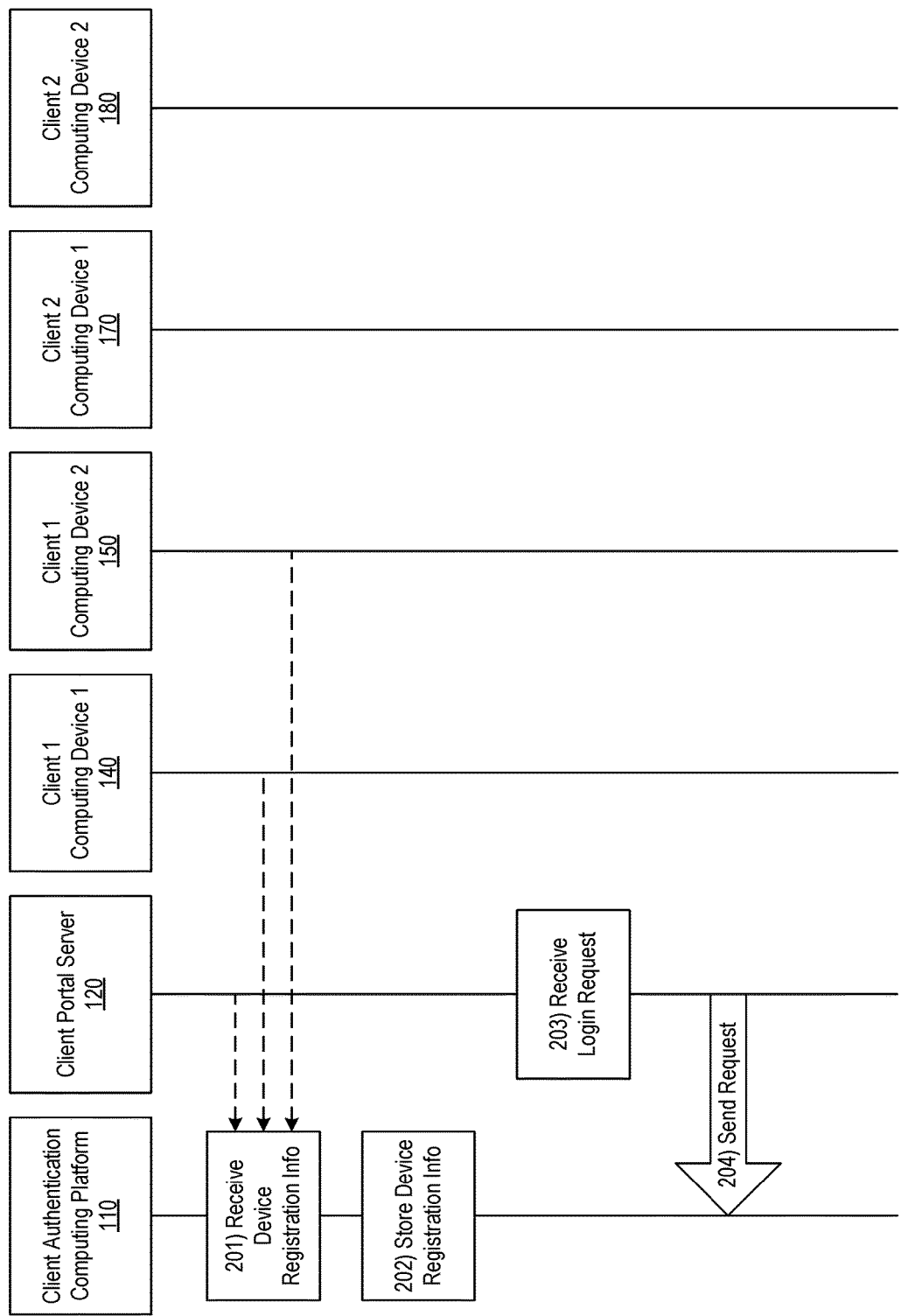

FIGS. 2A-2J depict an illustrative event sequence for preventing unauthorized access to secured information systems using multi-device authentication techniques in accordance with one or more example embodiments. Referring to FIG. 2A, at step 201, client authentication computing platform 110 may receive device registration information for a first user account (e.g., from client portal server 120, client computing device 140, client computing device 150, client computing device 160, and/or one or more other devices). For example, at step 201, client authentication computing platform 110 may receive first device registration information for a first user account associated with a client portal provided by a client portal server (e.g., client portal server 120). Such device registration information may, for example, register and/or otherwise link client computing device 140, client computing device 150, client computing device 160, and/or one or more other devices to the first user account (e.g., as authorized one-time passcode recipient devices for the first user account). In some instances, such device registration information may, for example, include a unique identifier associated with a particular client device being registered (such as client computing device 140, client computing device 150, and/or client computing device 160, for instance), a name and/or label associated with the particular client device being registered, one or more client portal usernames associated with the particular client device being registered, one or more account numbers and/or other account identifiers associated with the particular client device being registered, one or more authorized regions and/or countries associated with the particular client device being registered, and/or other information.

At step 202, client authentication computing platform 110 may store the device registration information for the first user account. For example, at step 202, client authentication computing platform 110 may store the first device registration information for the first user account associated with the client portal provided by the client portal server (e.g., client portal server 120). In addition, the first device registration information may identify a first registered device (e.g., client computing device 140), a second registered device (e.g., client computing device 150), and a third registered device (e.g., client computing device 160) as authorized passcode recipients for the first user account associated with the client portal provided by the client portal server (e.g., client portal server 120).

At step 203, client portal server 120 may receive a login request. For example, at step 203, client portal server 120 may receive a login request from client computing device 140, client computing device 150, client computing device 160, and/or another computing device requesting access to the client portal provided by the client portal server (e.g., client portal server 120) and/or to the first user account associated with the client portal provided by the client portal server (e.g., client portal server 120). At step 204, client portal server 120 may send an authentication request to client authentication computing platform 110. For example, at step 204, client portal server 120 may send an authentication request to client authentication computing platform 110 requesting client authentication computing platform 110 to authenticate a user of the client portal associated with the login request to a particular user account to which the user of the client portal has requested access (which may, e.g., be the first user account associated with the client portal provided by client portal server 120).

Figure 2B:
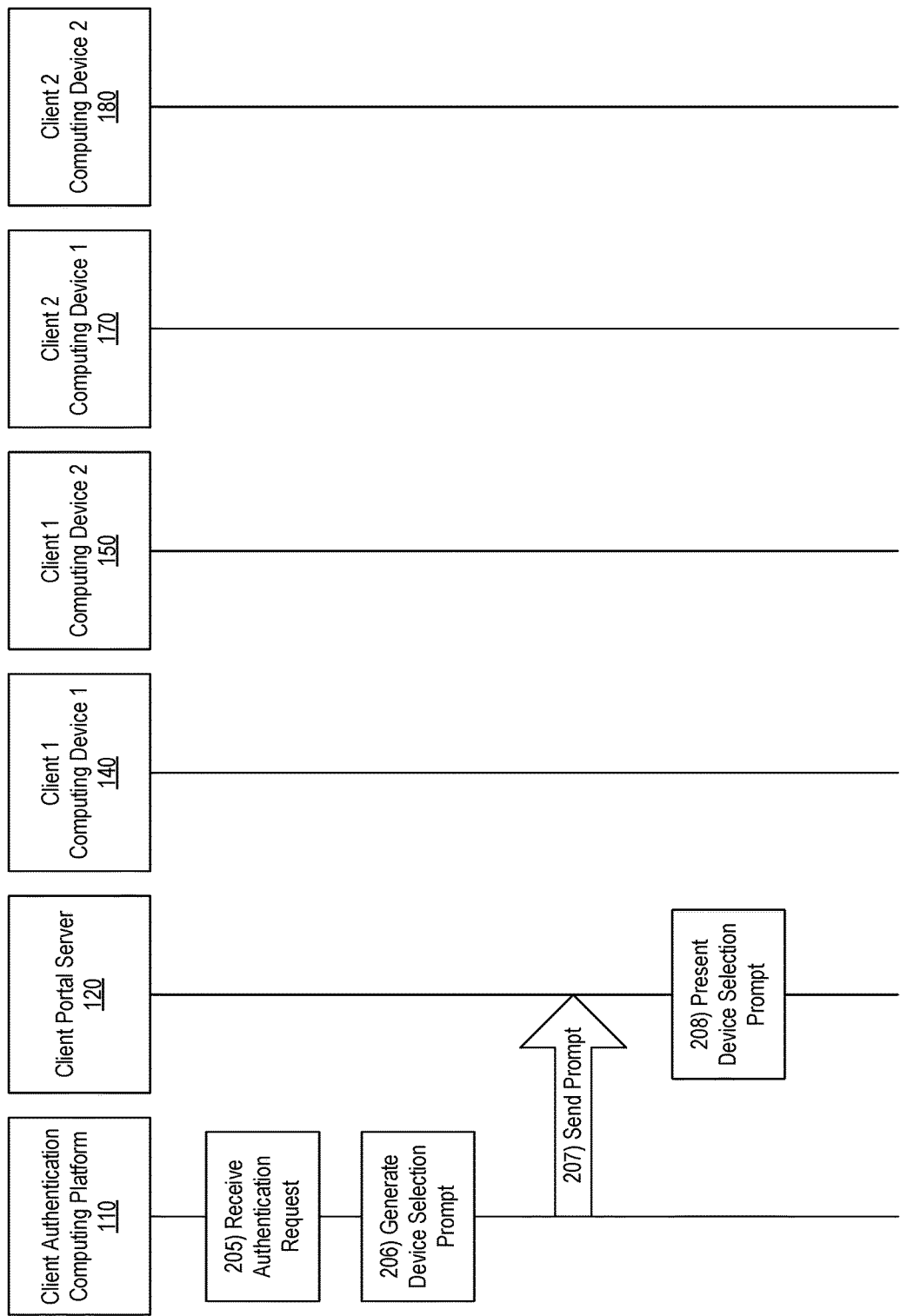

Referring to FIG. 2B, at step 205, client authentication computing platform 110 may receive the authentication request from client portal server 120. For example, at step 205, client authentication computing platform 110 may receive, via the communication interface (e.g., communication interface 115), and from a client portal server (e.g., client portal server 120), a request to authenticate a first user to a first user account associated with a client portal provided by the client portal server (e.g., client portal server 120).

At step 206, client authentication computing platform 110 may generate a device selection prompt. For example, at step 206, in response to receiving the request to authenticate the first user to the first user account associated with the client portal provided by the client portal server (e.g., client portal server 120), client authentication computing platform 110 may generate a first device selection prompt directing the client portal server (e.g., client portal server 120) to prompt the first user to select at least two devices to receive one-time passcodes. At step 207, client authentication computing platform 110 may send the device selection prompt to client portal server 120. For example, at step 207, client authentication computing platform 110 may send, via the communication interface (e.g., communication interface 115), and to the client portal server (e.g., client portal server 120), the first device selection prompt directing the client portal server (e.g., client portal server 120) to prompt the first user to select the at least two devices to receive the one-time passcodes. For instance, the first device selection prompt may be configured to cause client portal server 120 to prompt a user of the client portal to select two or more registered devices that are linked to the first user account to receive one-time passcodes, such as client computing device 140, client computing device 150, client computing device 160, and/or one or more other devices.

At step 208, client portal server 120 may present the device selection prompt received from client authentication computing platform 110. For example, in presenting the device selection prompt at step 208, client portal server 120 may present and/or cause one or more computing devices (e.g., the device being used by the user of the client portal provided by client portal server 120 to request access to the first user account) to display a graphical user interface similar to graphical user interface 300, which is illustrated in FIG. 3. As seen in FIG. 3, graphical user interface 300 may include information prompting a user to select two or more registered devices to receive one-time passcodes to continue with the authentication process (e.g., "To continue authenticating, please select at least two of your registered devices to receive one-time passcodes"), as well as one or more controls configured to allow the user to make a selection (e.g., "[ ] Device 1—'My Smart Phone'; [ ] Device 2—'My Mobile Tablet'; [ ] Device 3—'My Smart Watch'").

Referring to FIG. 2C, at step 209, client portal server 120 may receive device selection input. Such device selection input may be received by client portal server 120 via the user interface presented at step 208, for example, and may correspond to and/or include a selection of two or more particular devices to receive one-time passcodes as part of the authentication process being performed. At step 210, client portal server 120 may send the device selection input to client authentication computing platform 110.

At step 211, client authentication computing platform 110 may receive the device selection input from client portal server 120. For example, at step 211, client authentication computing platform 110 may receive, via the communication interface (e.g., communication interface 115), and from the client portal server (e.g., client portal server 120), first device selection input selecting a first registered device and a second registered device to receive one-time passcodes. For instance, the device selection input received by client authentication computing platform 110 from client portal server 120 may correspond to and/or include a selection of client computing device 140 and client computing device 150 as the first registered device and the second registered device to receive one-time passcodes.

At step 212, client authentication computing platform 110 may generate one-time passcodes for the selected devices (e.g., based on the device selection input received from client portal server 120). For example, at step 212, client authentication computing platform 110 may generate a first one-time passcode for the first registered device and a second one-time passcode for the second registered device. For instance, if the device selection input received by client authentication computing platform 110 from client portal server 120 corresponds to and/or includes a selection of client computing device 140 and client computing device 150 as the first registered device and the second registered device to receive the one-time passcodes, client authentication computing platform 110 may generate a first one-time passcode for client computing device 140 and a second one-time passcode for client computing device 150.

Figure 2D:
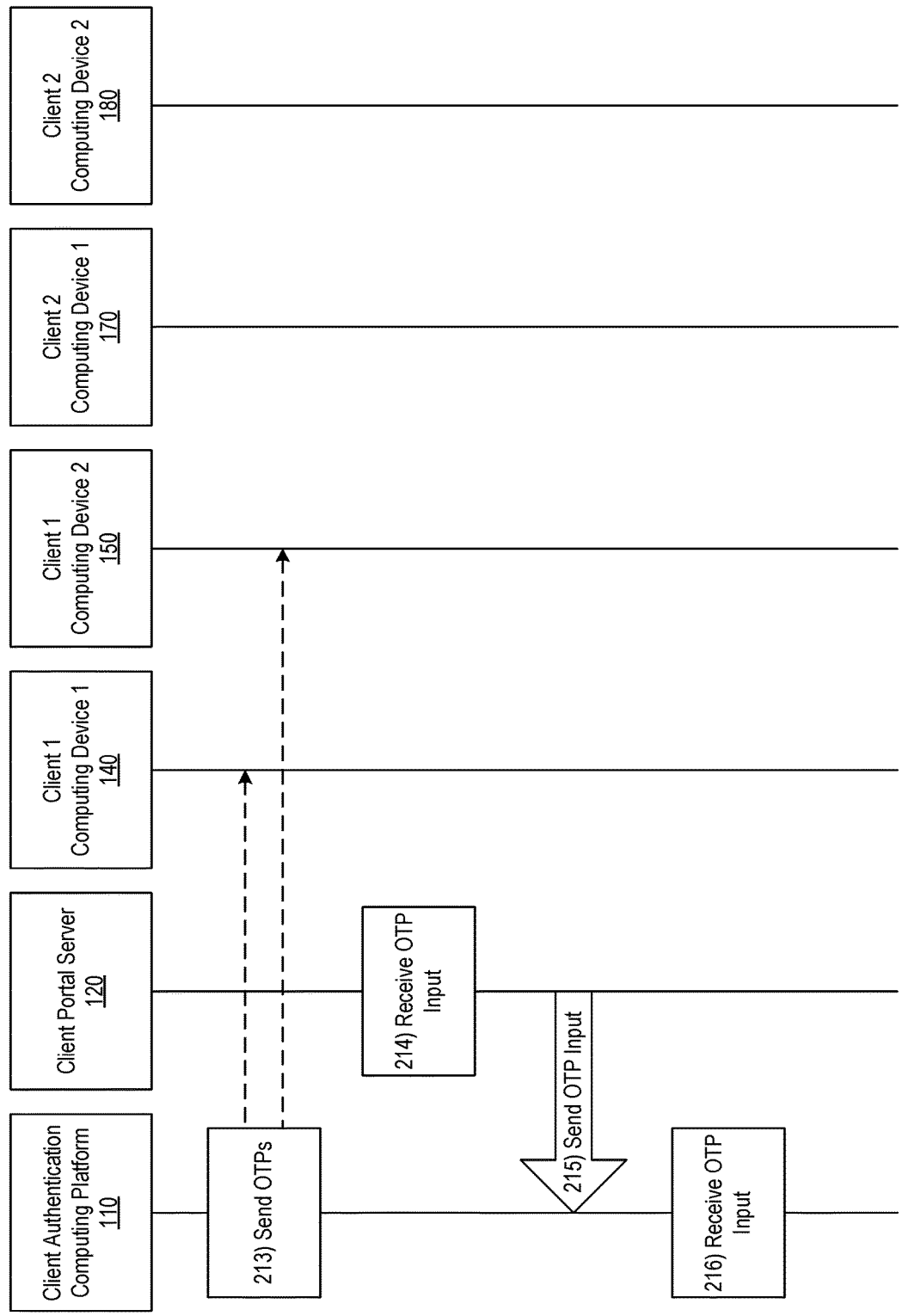

Referring to FIG. 2D, at step 213, client authentication computing platform 110 may send the one-time passcodes to the selected devices. For example, at step 213, client authentication computing platform 110 may send, via the communication interface (e.g., communication interface 115), the first one-time passcode to the first registered device and the second one-time passcode to the second registered device. For instance, client authentication computing platform 110 may send the first one-time passcode to client computing device 140 and the second one-time passcode to client computing device 150. In some instances, client authentication computing platform 110 may send one or more one-time passcodes to one or more mobile devices (e.g., client computing device 140, client computing device 150, client computing device 160) via a push notification server and/or a push notification service (which may, e.g., be associated with an operating system executed by the one or more mobile devices). Additionally or alternatively, the one or more one-time passcodes sent to one or more mobile devices (e.g., client computing device 140, client computing device 150, client computing device 160) may, in some instances, be presented by a mobile banking application executed by the one or more mobile devices (e.g., client computing device 140, client computing device 150, client computing device 160).

At step 214, client portal server 120 may receive one-time passcode input. For example, at step 214, client portal server 120 may receive one-time passcode input via one or more user interfaces presented by client portal server 120, and such one-time passcode input may include the first one-time passcode generated by client authentication computing platform 110 for the first registered device selected to receive a one-time passcode and the second one-time passcode generated by client authentication computing platform 110 for the second registered device selected to receive a one-time passcode. For instance, in receiving the one-time passcode input at step 214, client portal server 120 may present and/or cause one or more computing devices (e.g., the device being used by the user of the client portal provided by client portal server 120 to request access to the first user account) to display a graphical user interface similar to graphical user interface 400, which is illustrated in FIG. 4. As seen in FIG. 4, graphical user interface 400 may include information prompting a user to input the one-time passcodes sent to the selected devices to continue with the authentication process (e.g., "We have sent one-time passcodes to your selected devices. Please enter these passcodes in the fields below to continue"), as well as one or more fields and/or other controls configured to receive such input from the user (e.g., "OTP1: _____; OTP2: _____").

At step 215, client portal server 120 may send the one-time passcode input to client authentication computing platform 110. At step 216, client authentication computing platform 110 may receive the one-time passcode input from client portal server 120. For example, at step 216, client authentication computing platform 110 may receive, via the communication interface (e.g., communication interface 115), and from the client portal server (e.g., client portal server 120), first one-time passcode input.

Referring to FIG. 2E, at step 217, client authentication computing platform 110 may validate the one-time passcode input received from client portal server 120. For example, at step 217, client authentication computing platform 110 may validate the first one-time passcode input received from the client portal server (e.g., client portal server 120). In validating the first one-time passcode input, client authentication computing platform 110 may, for example, compare the first one-time passcode input to the first one-time passcode generated by client authentication computing platform 110 for the first registered device and the second one-time passcode generated by client authentication computing platform 110 for the second registered device to confirm that the first one-time passcode input matches the first one-time passcode generated by client authentication computing platform 110 for the first registered device and the second one-time passcode generated by client authentication computing platform 110 for the second registered device and is therefore valid. If client authentication computing platform 110 determines that the first one-time passcode input does not match the first one-time passcode generated by client authentication computing platform 110 for the first registered device and the second one-time passcode generated by client authentication computing platform 110 for the second registered device and is therefore not valid, client authentication computing platform 110 may generate and/or send one or more error messages to client portal server 120 and/or one or more other devices. Such error messages may, for instance, cause client portal server 120 to prompt the user of client portal server 120 requesting access to the first user account to try entering the one-time passcodes again, and if the user again provides invalid one-time passcode input, client authentication computing platform 110 may deny access to the first user account and/or the event sequence may end. If the first one-time passcode input is valid, the event sequence may continue as illustrated.

At step 218, client authentication computing platform 110 may generate a validation message. For example, at step 218, based on validating the first one-time passcode input received from the client portal server (e.g., client portal server 120), client authentication computing platform 110 may generate a first validation message directing the client portal server (e.g., client portal server 120) to provide the first user with access to the first user account. In some instances, in generating the first validation message directing the client portal server (e.g., client portal server 120) to provide the first user with access to the first user account, client authentication computing platform 110 may embed and/or otherwise include one or more tokens, certificates, and/or keys in the first validation message, and such tokens, certificates, and/or keys may be configured to enable and/or cause client portal server 120 to load and/or obtain user account information associated with the first user account from one or more other servers (which may, e.g., be associated with an organization, such as a financial institution, operating client authentication computing platform 110 and/or client portal server 120). For example, client authentication computing platform 110 may embed and/or otherwise include one or more tokens, certificates, and/or keys in the first validation message that enable and/or cause client portal server 120 to request, obtain, receive, and/or load financial account information associated with the first user account from one or more financial account management servers, so that client portal server 120 may subsequently present such financial account information via the client portal.

At step 219, client authentication computing platform 110 may send the validation message to client portal server 120. For example, at step 219, client authentication computing platform 110 may send, via the communication interface (e.g., communication interface 115), to the client portal server (e.g., client portal server 120), the first validation message directing the client portal server (e.g., client portal server 120) to provide the first user with access to the first user account.

At step 220, client portal server 120 may provide the first user with access to the first user account (e.g., based on and/or in response to receiving the validation message from client authentication computing platform 110). In providing the first user with access to the first user account, client portal server 120 may present and/or cause one or more computing devices (e.g., the device being used by the user of the client portal provided by client portal server 120 to request access to the first user account and which has been authenticated to the first user account) to display one or more graphical user interfaces that include account information and/or other information associated with the first user account. Such graphical user interfaces may, for example, be associated with an online banking portal and/or a mobile banking portal, as discussed above, and may include financial account information associated with the first user account, such as account balance information and/or transaction history information, as well as one or more controls via which one or more functions may be performed with respect to such financial account information, such as one or more bill pay functions, funds transfer functions, and/or the like.

In one or more alternative arrangements, instead of or in addition to sending one-time passcodes to the first registered device and the second registered device, client authentication computing platform 110 may send one or more biometric authentication prompts and/or other authentication prompts to the first registered device and/or the second registered device. For example, in performing the example sequence of events discussed above in authenticating the first user to the first user account, client authentication computing platform 110 may additionally or alternatively generate and/or send one or more biometric authentication prompts and/or other authentication prompts to one or more registered devices associated with the first user account (e.g., client computing device 140, client computing device 150, client computing device 160). Such biometric authentication prompts may, for instance, prompt a recipient device and/or a user of such a recipient device to provide biometric input (e.g., fingerprint biometric input, voiceprint biometric input, facial scan biometric input, retinal scan biometric input, and/or other biometric input) for validation by the recipient device and/or by client authentication computing platform 110.

In one or more alternative arrangements, client authentication computing platform 110 may additionally or alternatively send one or more one-time passcodes, one or more biometric authentication prompts, and/or one or more other authentication prompts to one or more additional registered devices associated with the first user account (e.g., a third registered device in addition to the first registered device and the second registered device). For example, prior to generating the first validation message directing the client portal server (e.g., client portal server 120) to provide the first user with access to the first user account, client authentication computing platform 110 may receive input selecting a third registered device associated with the first user account (e.g., client computing device 160) to receive an authentication prompt, and client authentication computing platform 110 may generate and send a registered-device authentication prompt to the third registered device associated with the first user account (e.g., client computing device 160). In some instances, the registered-device authentication prompt generated and sent to the third registered device associated with the first user account (e.g., client computing device 160) may be and/or include a biometric authentication prompt. Such a biometric authentication prompt may prompt the third registered device associated with the first user account (e.g., client computing device 160) and/or a user of the third registered device associated with the first user account (e.g., client computing device 160) to provide biometric input (e.g., fingerprint biometric input, voiceprint biometric input, facial scan biometric input, retinal scan biometric input, and/or other biometric input) for validation by the third registered device associated with the first user account (e.g., client computing device 160) and/or by client authentication computing platform 110.

Subsequently, one or more steps of the event sequence discussed above may be repeated by client authentication computing platform 110 and/or the other systems discussed above in authenticating another user to the client portal provided by client portal server 120. Although such steps are illustrated separately and following the steps performed with respect to authenticating the first user, various steps may be performed in a different order, such that client authentication computing platform 110 may, for instance, authenticate multiple users simultaneously as client portal server 120 receives requests to access different user accounts from different users.

Figure 2F:
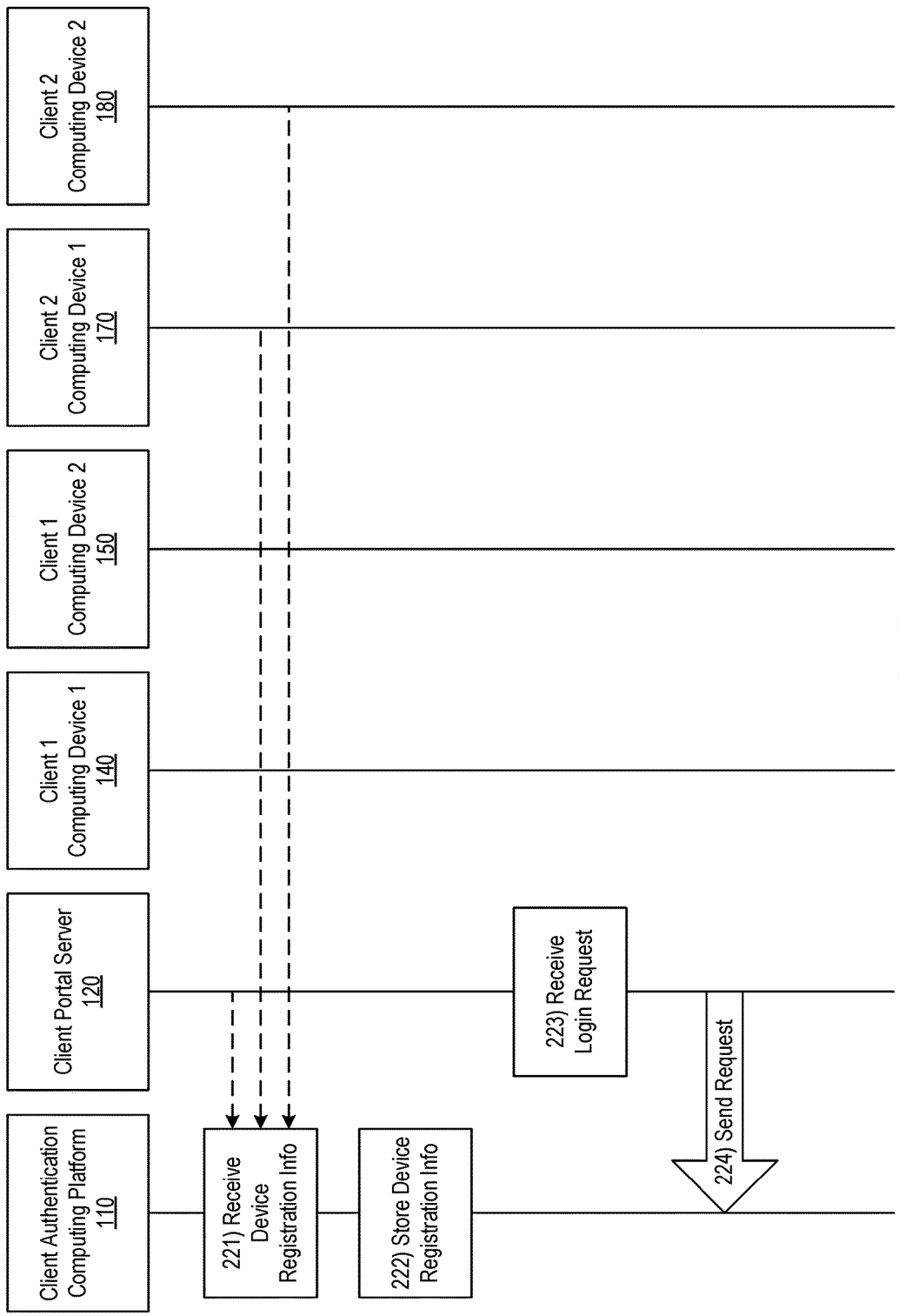

Referring to FIG. 2F, at step 221, client authentication computing platform 110 may receive device registration information for a second user account (e.g., from client portal server 120, client computing device 170, client computing device 180, client computing device 185, and/or one or more other devices). For example, at step 221, client authentication computing platform 110 may receive second device registration information for the second user account associated with the client portal provided by the client portal server (e.g., client portal server 120). Such device registration information may, for example, register and/or otherwise link client computing device 170, client computing device 180, client computing device 185, and/or one or more other devices to the second user account (e.g., as authorized one-time passcode recipient devices for the second user account). In some instances, such device registration information may, for example, include a unique identifier associated with a particular client device being registered (such as client computing device 170, client computing device 180, client computing device 185, for instance), a name and/or label associated with the particular client device being registered, one or more client portal usernames associated with the particular client device being registered, one or more account numbers and/or other account identifiers associated with the particular client device being registered, one or more authorized regions and/or countries associated with the particular client device being registered, and/or other information.

At step 222, client authentication computing platform 110 may store the device registration information for the second user account. For example, at step 222, client authentication computing platform 110 may store the second device registration information for the second user account associated with the client portal provided by the client portal server (e.g., client portal server 120). In addition, the second device registration information may identify a third registered device (e.g., client computing device 170), a fourth registered device (e.g., client computing device 180), and a fifth registered device (e.g., client computing device 185) as authorized passcode recipients for the second user account associated with the client portal provided by the client portal server (e.g., client portal server 120).

At step 223, client portal server 120 may receive a login request. For example, at step 223, client portal server 120 may receive a login request from client computing device 170, client computing device 180, client computing device 185, and/or another computing device requesting access to the client portal provided by the client portal server (e.g., client portal server 120) and/or to the second user account associated with the client portal provided by the client portal server (e.g., client portal server 120). At step 224, client portal server 120 may send an authentication request to client authentication computing platform 110. For example, at step 224, client portal server 120 may send an authentication request to client authentication computing platform 110 requesting client authentication computing platform 110 to authenticate a user of the client portal associated with the login request to a particular user account to which the user of the client portal has requested access (which may, e.g., be the second user account associated with the client portal provided by client portal server 120).

Figure 2G:
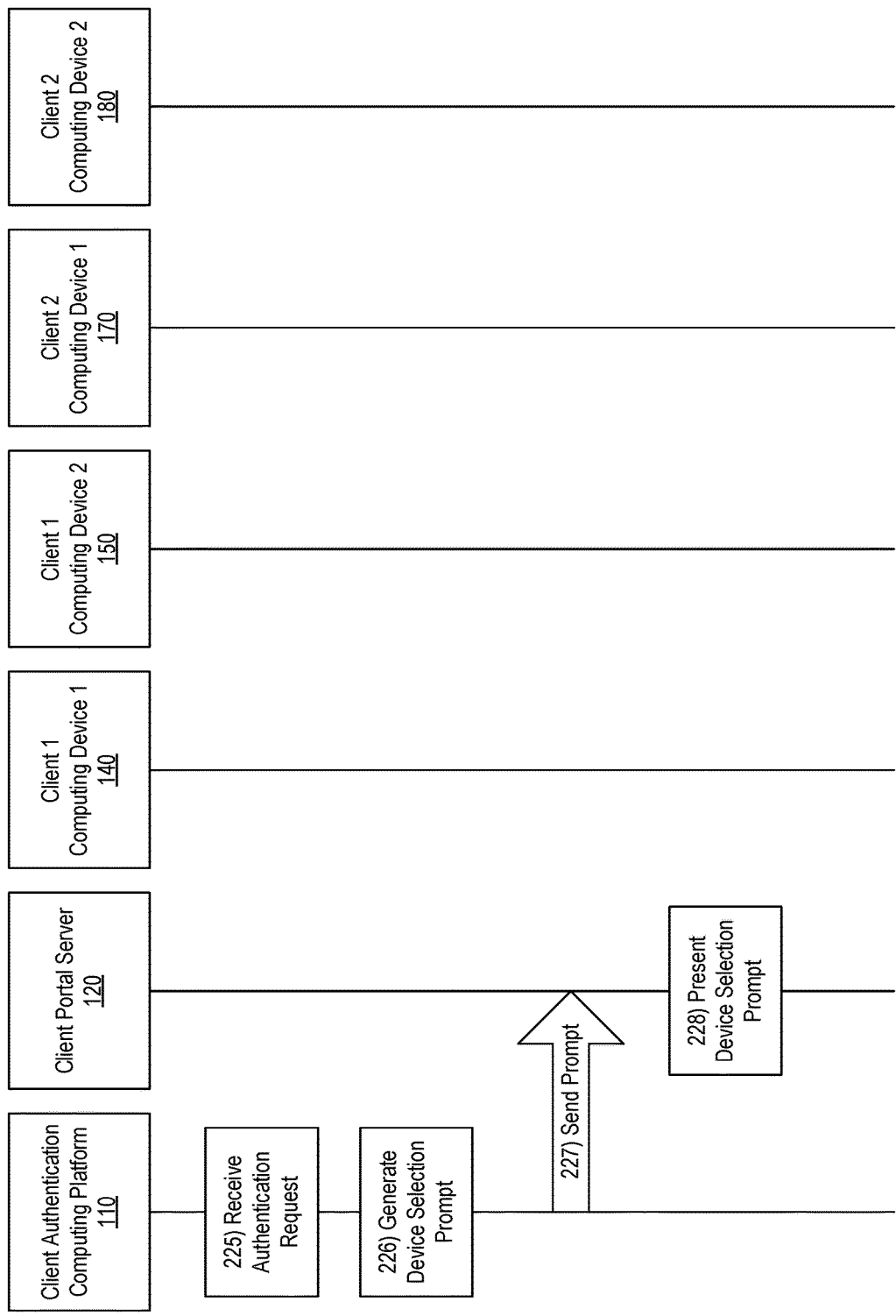

Referring to FIG. 2G, at step 225, client authentication computing platform 110 may receive the authentication request from client portal server 120. For example, at step 225, client authentication computing platform 110 may receive, via the communication interface (e.g., communication interface 115), and from the client portal server (e.g., client portal server 120), a request to authenticate a second user to a second user account associated with the client portal provided by the client portal server (e.g., client portal server 120).

At step 226, client authentication computing platform 110 may generate a device selection prompt. For example, at step 226, in response to receiving the request to authenticate the second user to the second user account associated with the client portal provided by the client portal server (e.g., client portal server 120), client authentication computing platform 110 may generate a second device selection prompt directing the client portal server (e.g., client portal server 120) to prompt the second user to select at least two devices to receive the one-time passcodes. At step 227, client authentication computing platform 110 may send the device selection prompt to client portal server 120. For example, at step 227, client authentication computing platform 110 may send, via the communication interface (e.g., communication interface 115), and to the client portal server (e.g., client portal server 120), the second device selection prompt directing the client portal server (e.g., client portal server 120) to prompt the second user to select the at least two devices to receive the one-time passcodes. For instance, the second device selection prompt may be configured to cause client portal server 120 to prompt a user of the client portal to select two or more registered devices that are linked to the second user account to receive one-time passcodes, such as client computing device 170, client computing device 180, client computing device 185, and/or one or more other devices.

At step 228, client portal server 120 may present the device selection prompt. For example, in presenting the device selection prompt at step 228, client portal server 120 may present and/or cause one or more computing devices (e.g., the device being used by the user of the client portal provided by client portal server 120 to request access to the second user account) to display a graphical user interface similar to graphical user interface 500, which is illustrated in FIG. 5. As seen in FIG. 5, graphical user interface 500 may include information prompting a user to select two or more registered devices to receive one-time passcodes to continue with the authentication process (e.g., "To continue authenticating, please select at least two of your registered devices to receive one-time passcodes"), as well as one or more controls configured to allow the user to make a selection (e.g., "[ ] Device 1—'My Personal Phone'; [ ] Device 2—'My Work Phone'; [ ] Device 3—'My Mobile Tablet'").

Figure 2H:
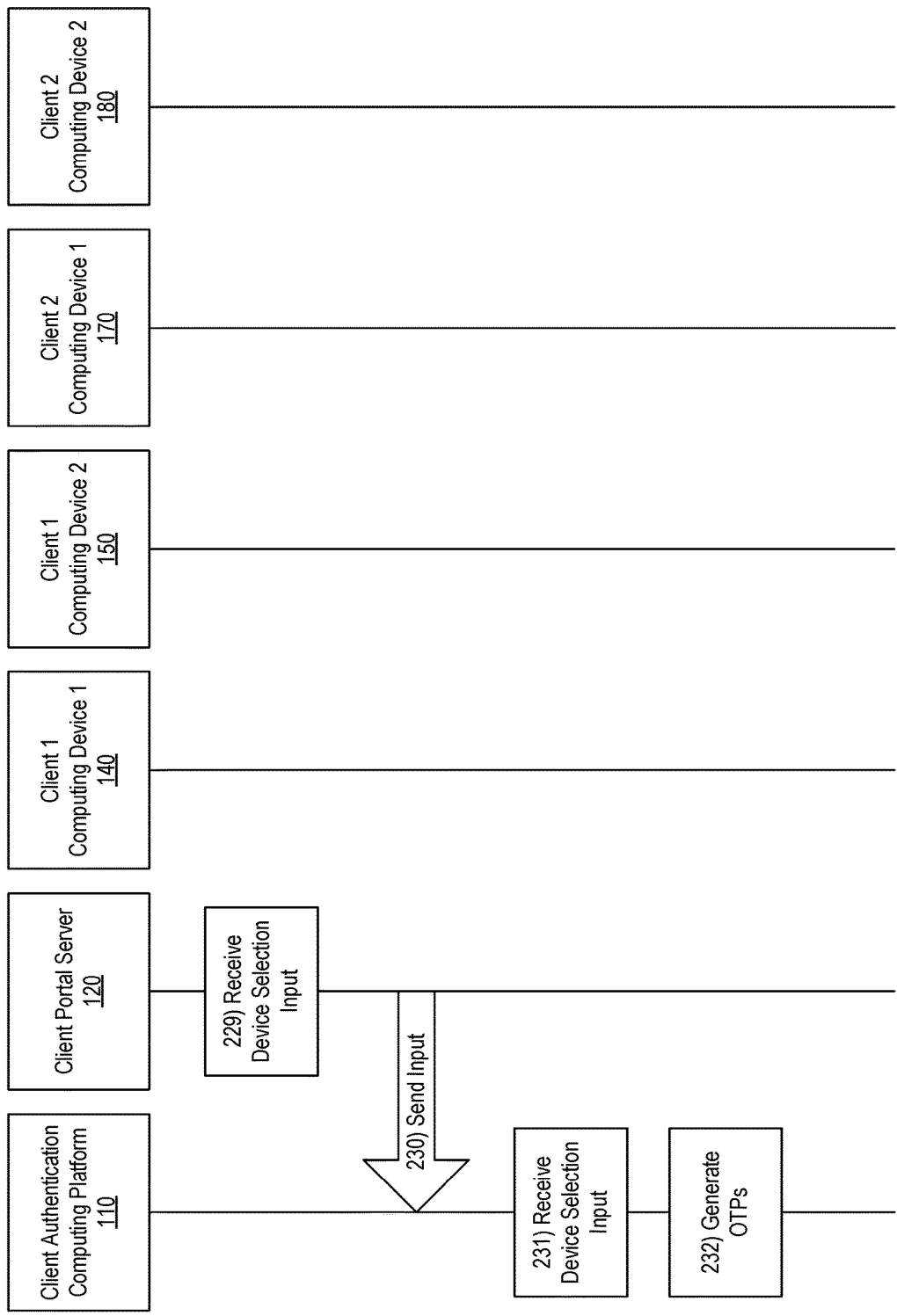

Referring to FIG. 2H, at step 229, client portal server 120 may receive device selection input. Such device selection input may be received by client portal server 120 via the user interface presented at step 228, for example, and may correspond to and/or include a selection of two or more particular devices to receive one-time passcodes as part of the authentication process being performed. At step 230, client portal server 120 may send the device selection input to client authentication computing platform 110.

At step 231, client authentication computing platform 110 may receive the device selection input from client portal server 120. For example, at step 231, client authentication computing platform 110 may receive, via the communication interface (e.g., communication interface 115), and from the client portal server (e.g., client portal server 120), second device selection input selecting a third registered device and a fourth registered device to receive one-time passcodes. For instance, the device selection input received by client authentication computing platform 110 from client portal server 120 may correspond to and/or include a selection of client computing device 170 and client computing device 180 as the third registered device and the fourth registered device to receive one-time passcodes.

At step 232, client authentication computing platform 110 may generate one-time passcodes for the selected devices (e.g., based on the device selection input received from client portal server 120). For example, at step 232, client authentication computing platform 110 may generate a third one-time passcode for the third registered device and a fourth one-time passcode for the fourth registered device. For instance, if the device selection input received by client authentication computing platform 110 from client portal server 120 corresponds to and/or includes a selection of client computing device 170 and client computing device 180 as the third registered device and the fourth registered device to receive the one-time passcodes, client authentication computing platform 110 may generate a third one-time passcode for client computing device 170 and a fourth one-time passcode for client computing device 180.

Figure 2I:
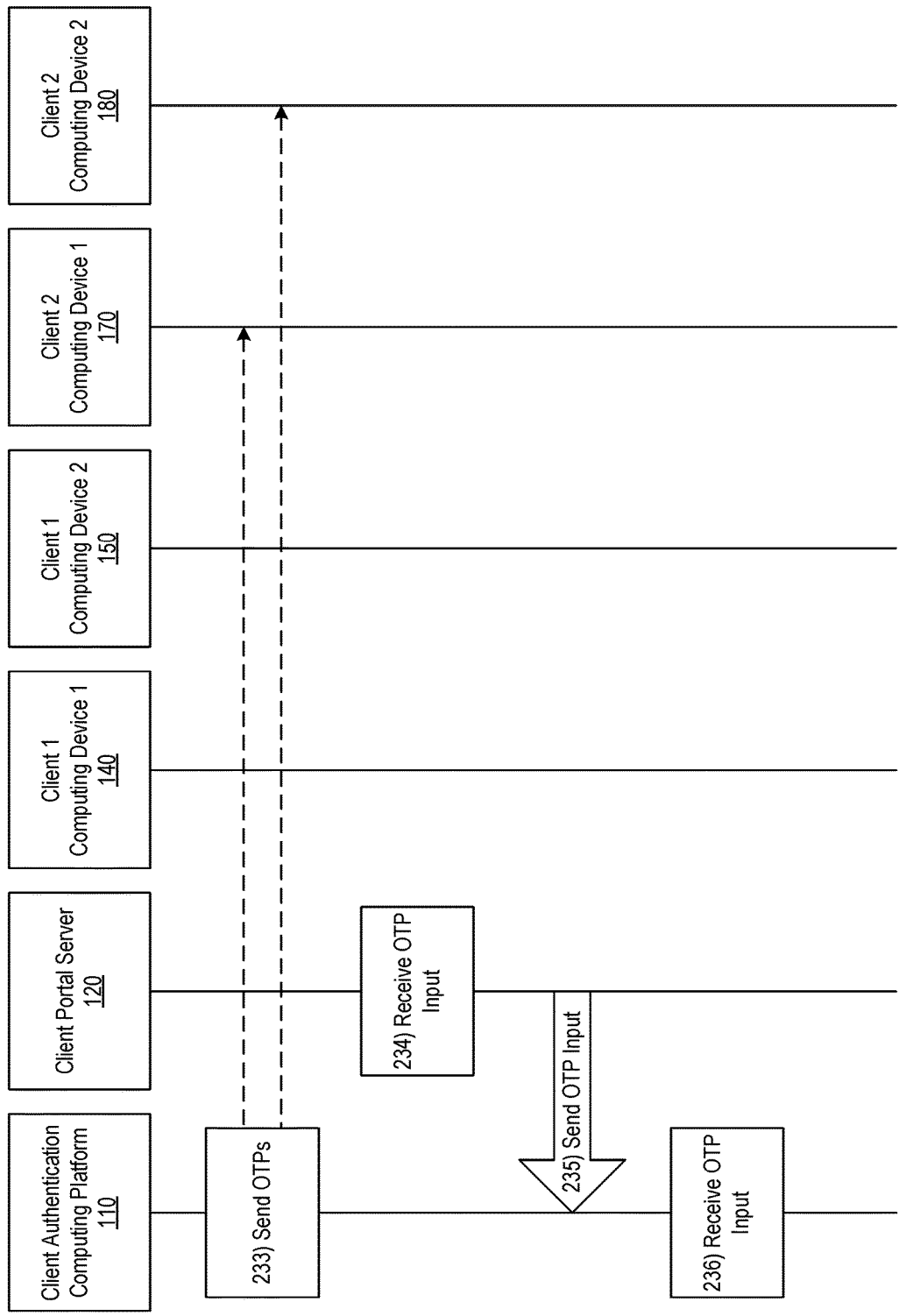

Referring to FIG. 2I, at step 233, client authentication computing platform 110 may send the one-time passcodes to the selected devices. For example, at step 233, client authentication computing platform 110 may send, via the communication interface (e.g., communication interface 115), the third one-time passcode to the third registered device and the fourth one-time passcode to the fourth registered device. For instance, client authentication computing platform 110 may send the third one-time passcode to client computing device 170 and the fourth one-time passcode to client computing device 180. In some instances, client authentication computing platform 110 may send one or more one-time passcodes to one or more mobile devices (e.g., client computing device 170, client computing device 180, client computing device 185) via a push notification server and/or a push notification service (which may, e.g., be associated with an operating system executed by the one or more mobile devices). Additionally or alternatively, the one or more one-time passcodes sent to one or more mobile devices (e.g., client computing device 170, client computing device 180, client computing device 185) may, in some instances, be presented by a mobile banking application executed by the one or more mobile devices (e.g., client computing device 170, client computing device 180, client computing device 185).

At step 234, client portal server 120 may receive one-time passcode input. For example, at step 234, client portal server 120 may receive one-time passcode input via one or more user interfaces presented by client portal server 120, and such one-time passcode input may include the third one-time passcode generated by client authentication computing platform 110 for the third registered device selected to receive a one-time passcode and the fourth one-time passcode generated by client authentication computing platform 110 for the fourth registered device selected to receive a one-time passcode. For instance, in receiving the one-time passcode input at step 234, client portal server 120 may present and/or cause one or more computing devices (e.g., the device being used by the user of the client portal provided by client portal server 120 to request access to the second user account) to display a graphical user interface similar to graphical user interface 600, which is illustrated in FIG. 6. As seen in FIG. 6, graphical user interface 600 may include information prompting a user to input the one-time passcodes sent to the selected devices to continue with the authentication process (e.g., "We have sent one-time passcodes to your selected devices. Please enter these passcodes in the fields below to continue"), as well as one or more fields and/or other controls configured to receive such input from the user (e.g., "OTP1: _____; OTP2: _____").

At step 235, client portal server 120 may send the one-time passcode input to client authentication computing platform 110. At step 236, client authentication computing platform 110 may receive the one-time passcode input from client portal server 120. For example, at step 236, client authentication computing platform 110 may receive, via the communication interface (e.g., communication interface 115), and from the client portal server (e.g., client portal server 120), second one-time passcode input.

Figure 2J:
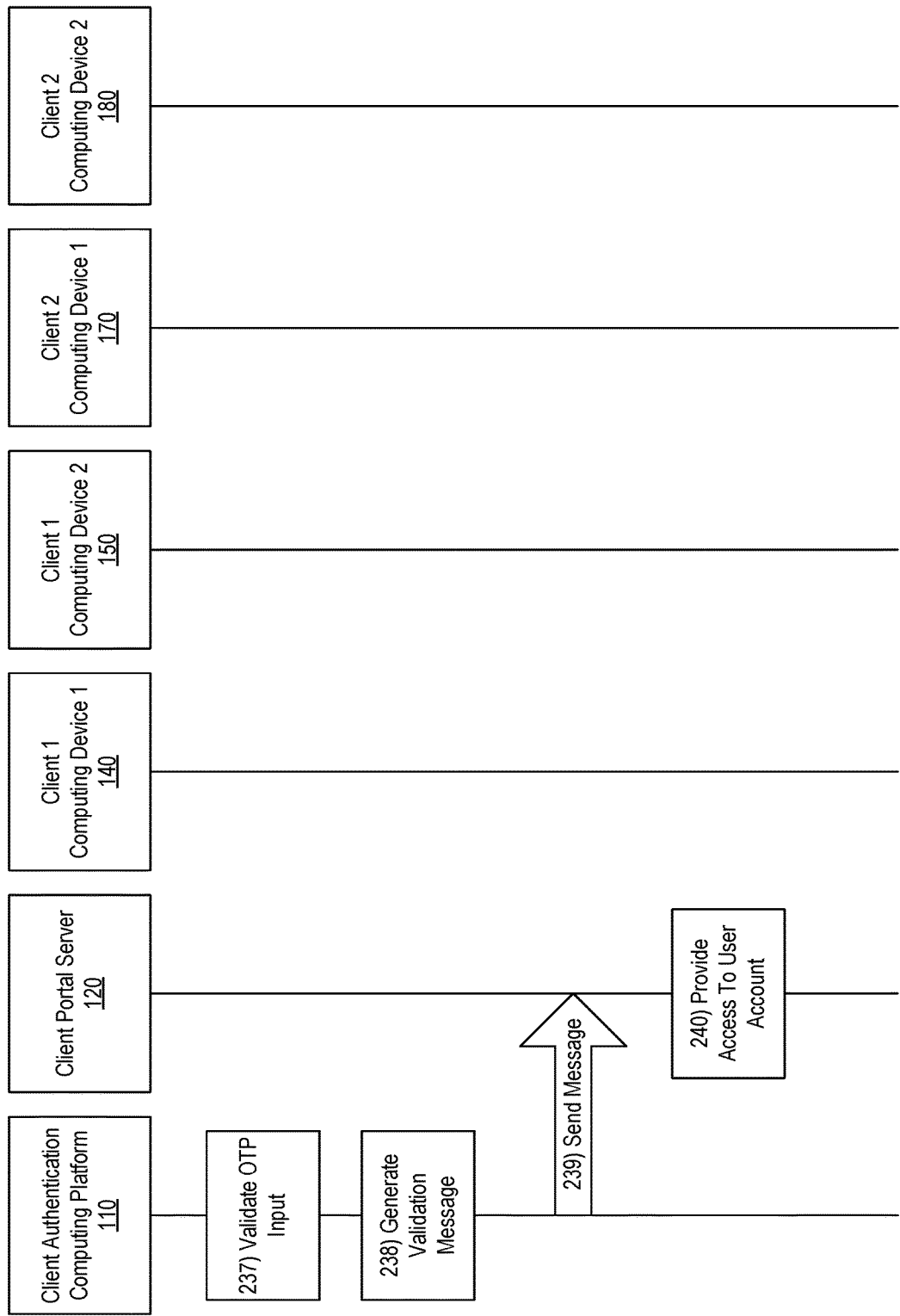

Referring to FIG. 2J, at step 237, client authentication computing platform 110 may validate the one-time passcode input received from client portal server 120. For example, at step 237, client authentication computing platform 110 may validate the second one-time passcode input received from the client portal server (e.g., client portal server 120). In validating the second one-time passcode input, client authentication computing platform 110 may, for example, compare the second one-time passcode input to the third one-time passcode generated by client authentication computing platform 110 for the third registered device and the fourth one-time passcode generated by client authentication computing platform 110 for the fourth registered device to confirm that the second one-time passcode input matches the third one-time passcode generated by client authentication computing platform 110 for the third registered device and the fourth one-time passcode generated by client authentication computing platform 110 for the fourth registered device and is therefore valid. If client authentication computing platform 110 determines that the second one-time passcode input does not match the third one-time passcode generated by client authentication computing platform 110 for the third registered device and the fourth one-time passcode generated by client authentication computing platform 110 for the fourth registered device and is therefore not valid, client authentication computing platform 110 may generate and/or send one or more error messages to client portal server 120 and/or one or more other devices. Such error messages may, for instance, cause client portal server 120 to prompt the user of client portal server 120 requesting access to the second user account to try entering the one-time passcodes again, and if the user again provides invalid one-time passcode input, client authentication computing platform 110 may deny access to the second user account and/or the event sequence may end. If the second one-time passcode input is valid, the event sequence may continue as illustrated.

At step 238, client authentication computing platform 110 may generate a validation message. For example, at step 238, based on validating the second one-time passcode input received from the client portal server (e.g., client portal server 120), client authentication computing platform 110 may generate a second validation message directing the client portal server (e.g., client portal server 120) to provide the second user with access to the second user account. In some instances, in generating the second validation message directing the client portal server (e.g., client portal server 120) to provide the second user with access to the second user account, client authentication computing platform 110 may embed and/or otherwise include one or more tokens, certificates, and/or keys in the second validation message, and such tokens, certificates, and/or keys may be configured to enable and/or cause client portal server 120 to load and/or obtain user account information associated with the second user account from one or more other servers (which may, e.g., be associated with an organization, such as a financial institution, operating client authentication computing platform 110 and/or client portal server 120). For example, client authentication computing platform 110 may embed and/or otherwise include one or more tokens, certificates, and/or keys in the second validation message that enable and/or cause client portal server 120 to request, obtain, receive, and/or load financial account information associated with the second user account from one or more financial account management servers, so that client portal server 120 may subsequently present such financial account information via the client portal.

At step 239, client authentication computing platform 110 may send the validation message to client portal server 120. For example, at step 239, client authentication computing platform 110 may send, via the communication interface (e.g., communication interface 115), to the client portal server (e.g., client portal server 120), the second validation message directing the client portal server (e.g., client portal server 120) to provide the second user with access to the second user account.

At step 240, client portal server 120 may provide the second user with access to the second user account (e.g., based on and/or in response to receiving the validation message from client authentication computing platform 110). In providing the second user with access to the second user account, client portal server 120 may present and/or cause one or more computing devices (e.g., the device being used by the user of the client portal provided by client portal server 120 to request access to the second user account and which has been authenticated to the second user account) to display one or more graphical user interfaces that include account information and/or other information associated with the second user account. Such graphical user interfaces may, for example, be associated with an online banking portal and/or a mobile banking portal, as discussed above, and may include financial account information associated with the second user account, such as account balance information and/or transaction history information, as well as one or more controls via which one or more functions may be performed with respect to such financial account information, such as one or more bill pay functions, funds transfer functions, and/or the like.

In one or more alternative arrangements, instead of or in addition to sending one-time passcodes to the third registered device and the fourth registered device, client authentication computing platform 110 may send one or more biometric authentication prompts and/or other authentication prompts to the third registered device and/or the fourth registered device. For example, in performing the example sequence of events discussed above in authenticating the second user to the second user account, client authentication computing platform 110 may additionally or alternatively generate and/or send one or more biometric authentication prompts and/or other authentication prompts to one or more registered devices associated with the second user account (e.g., client computing device 170, client computing device 180, client computing device 185). Such biometric authentication prompts may, for instance, prompt a recipient device and/or a user of such a recipient device to provide biometric input (e.g., fingerprint biometric input, voiceprint biometric input, facial scan biometric input, retinal scan biometric input, and/or other biometric input) for validation by the recipient device and/or by client authentication computing platform 110.

In one or more alternative arrangements, client authentication computing platform 110 may additionally or alternatively send one or more one-time passcodes, one or more biometric authentication prompts, and/or one or more other authentication prompts to one or more additional registered devices associated with the second user account (e.g., a fifth registered device in addition to the third registered device and the fourth registered device). For example, prior to generating the second validation message directing the client portal server (e.g., client portal server 120) to provide the second user with access to the second user account, client authentication computing platform 110 may receive input selecting a fifth registered device associated with the second user account (e.g., client computing device 185) to receive an authentication prompt, and client authentication computing platform 110 may generate and send a registered-device authentication prompt to the fifth registered device associated with the second user account (e.g., client computing device 185). In some instances, the registered-device authentication prompt generated and sent to the fifth registered device associated with the second user account (e.g., client computing device 185) may be and/or include a biometric authentication prompt. Such a biometric authentication prompt may prompt the fifth registered device associated with the second user account (e.g., client computing device 185) and/or a user of the fifth registered device associated with the second user account (e.g., client computing device 185) to provide biometric input (e.g., fingerprint biometric input, voiceprint biometric input, facial scan biometric input, retinal scan biometric input, and/or other biometric input) for validation by the fifth registered device associated with the second user account (e.g., client computing device 185) and/or by client authentication computing platform 110.

Figure 7:
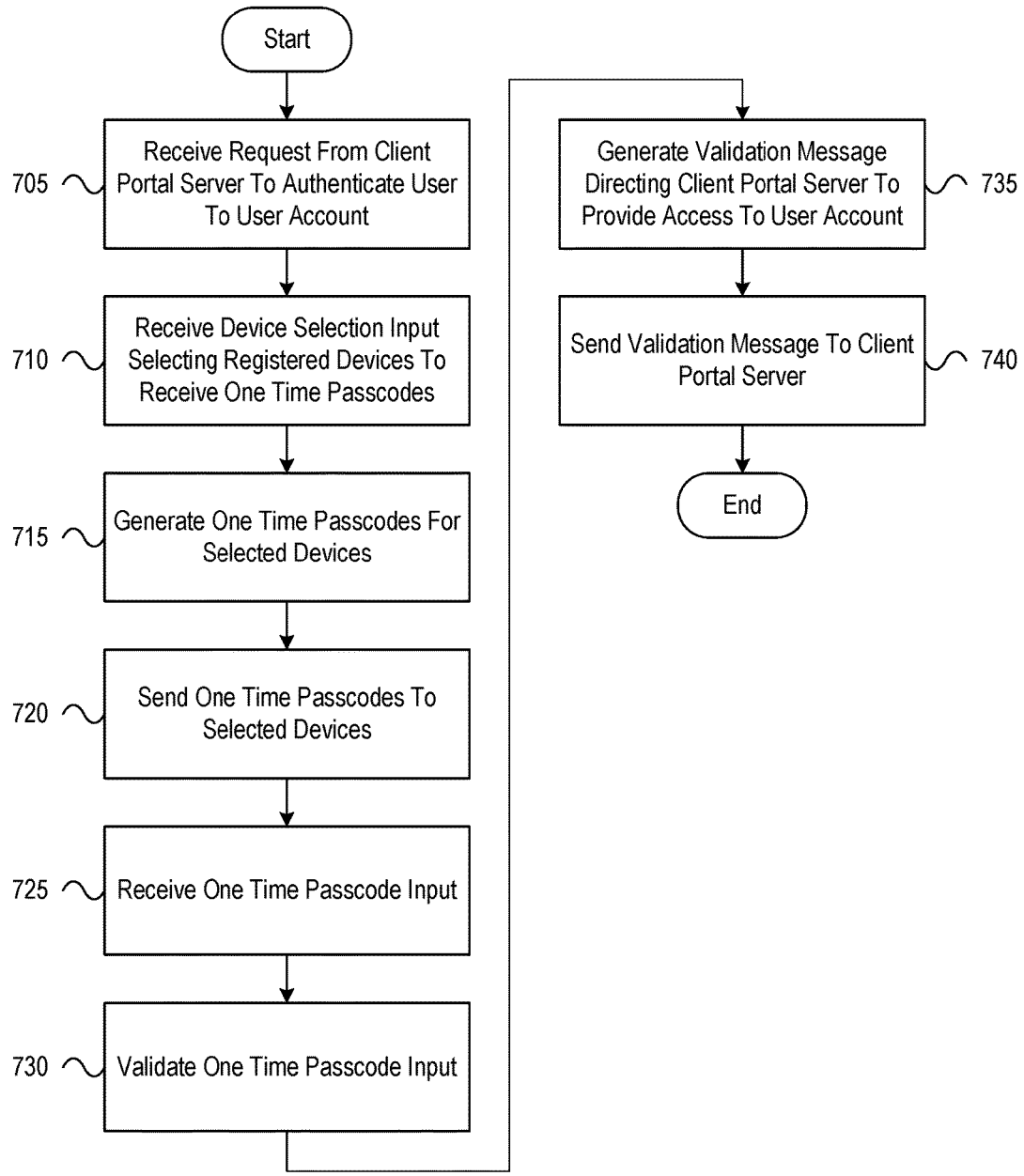
FIG. 7 depicts an illustrative method for preventing unauthorized access to secured information systems using multi-device authentication techniques in accordance with one or more example embodiments.

FIG. 7 depicts an illustrative method for preventing unauthorized access to secured information systems using multi-device authentication techniques in accordance with one or more example embodiments. Referring to FIG. 7, at step 705, a computing platform having at least one processor, a memory, and a communication interface may receive, via the communication interface, and from a client portal server, a request to authenticate a first user to a first user account associated with a client portal provided by the client portal server. At step 710, the computing platform may receive, via the communication interface, and from the client portal server, first device selection input selecting a first registered device and a second registered device to receive one-time passcodes. At step 715, the computing platform may generate a first one-time passcode for the first registered device and a second one-time passcode for the second registered device. At step 720, the computing platform may send, via the communication interface, the first one-time passcode to the first registered device and the second one-time passcode to the second registered device. At step 725, the computing platform may receive, via the communication interface, and from the client portal server, first one-time passcode input. At step 730, the computing platform may validate the first one-time passcode input received from the client portal server. At step 735, based on validating the first one-time passcode input received from the client portal server, the computing platform may generate a first validation message directing the client portal server to provide the first user with access to the first user account. At step 740, the computing platform may send, via the communication interface, to the client portal server, the first validation message directing the client portal server to provide the first user with access to the first user account.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive, via the communication interface, and from a client portal server, a request to authenticate a first user to a first user account associated with a client portal provided by the client portal server;
      in response to receiving the request to authenticate the first user to the first user account associated with the client portal provided by the client portal server:
         generate a first device selection prompt directing the client portal server to prompt the first user to select at least two devices to receive one-time passcodes;
         send, via the communication interface, and to the client portal server, the first device selection prompt directing the client portal server to prompt the first user to select the at least two devices to receive the one-time passcodes;
      receive, via the communication interface, and from the client portal server, first device selection input selecting a first registered device and a second registered device to receive the one-time passcodes;
      generate a first one-time passcode for the first registered device and a second one-time passcode for the second registered device;
      send, via the communication interface, the first one-time passcode to the first registered device and the second one-time passcode to the second registered device;
      receive, via the communication interface, and from the client portal server, first one-time passcode input;
      validate the first one-time passcode input received from the client portal server;
      based on validating the first one-time passcode input received from the client portal server, generate a first validation message directing the client portal server to provide the first user with access to the first user account; and
      send, via the communication interface, to the client portal server, the first validation message directing the client portal server to provide the first user with access to the first user account.

2. The computing platform of claim 1, wherein the memory stores additional computer-readable instructions that, when executed by the at least one processor, cause the computing platform to:
   prior to receiving the request to authenticate the first user to the first user account associated with the client portal provided by the client portal server:
      receive first device registration information for the first user account associated with the client portal provided by the client portal server; and
      store the first device registration information for the first user account associated with the client portal provided by the client portal server,
   wherein the first device registration information identifies the first registered device, the second registered device, and a third registered device as authorized passcode recipients for the first user account associated with the client portal provided by the client portal server.

3. The computing platform of claim 1, wherein prior to generating the first validation message directing the client portal server to provide the first user with access to the first user account, the computing platform receives input selecting a third registered device associated with the first user account to receive an authentication prompt, and the computing platform generates and sends a registered-device authentication prompt to the third registered device associated with the first user account.

4. The computing platform of claim 3, wherein the registered-device authentication prompt generated and sent to the third registered device associated with the first user account comprises a biometric authentication prompt.

5. The computing platform of claim 1, wherein the memory stores additional computer-readable instructions that, when executed by the at least one processor, cause the computing platform to:
  receive, via the communication interface, and from the client portal server, a request to authenticate a second user to a second user account associated with the client portal provided by the client portal server;
  receive, via the communication interface, and from the client portal server, second device selection input selecting a third registered device and a fourth registered device to receive one-time passcodes;
  generate a third one-time passcode for the third registered device and a fourth one-time passcode for the fourth registered device;
  send, via the communication interface, the third one-time passcode to the third registered device and the fourth one-time passcode to the fourth registered device;
  receive, via the communication interface, and from the client portal server, second one-time passcode input;
  validate the second one-time passcode input received from the client portal server;
  based on validating the second one-time passcode input received from the client portal server, generate a second validation message directing the client portal server to provide the second user with access to the second user account; and
  send, via the communication interface, to the client portal server, the second validation message directing the client portal server to provide the second user with access to the second user account.

6. The computing platform of claim 5, wherein the memory stores additional computer-readable instructions that, when executed by the at least one processor, cause the computing platform to:
  prior to receiving the request to authenticate the second user to the second user account associated with the client portal provided by the client portal server:
    receive second device registration information for the second user account associated with the client portal provided by the client portal server; and
    store the second device registration information for the second user account associated with the client portal provided by the client portal server,
  wherein the second device registration information identifies the third registered device, the fourth registered device, and a fifth registered device as authorized passcode recipients for the second user account associated with the client portal provided by the client portal server.

7. The computing platform of claim 5, wherein the memory stores additional computer-readable instructions that, when executed by the at least one processor, cause the computing platform to:
  in response to receiving the request to authenticate the second user to the second user account associated with the client portal provided by the client portal server:
    generate a second device selection prompt directing the client portal server to prompt the second user to select at least two devices to receive the one-time passcodes; and
    send, via the communication interface, and to the client portal server, the second device selection prompt directing the client portal server to prompt the second user to select the at least two devices to receive the one-time passcodes.

8. The computing platform of claim 7, wherein prior to generating the second validation message directing the client portal server to provide the second user with access to the second user account, the computing platform receives input selecting a fifth registered device associated with the second user account to receive an authentication prompt, and the computing platform generates and sends a registered-device authentication prompt to the fifth registered device associated with the second user account.

9. The computing platform of claim 8, wherein the registered-device authentication prompt generated and sent to the fifth registered device associated with the second user account comprises a biometric authentication prompt.

10. A method, comprising:
  at a computing platform comprising at least one processor, memory, and a communication interface:
    receiving, by the at least one processor, via the communication interface, and from a client portal server, a request to authenticate a first user to a first user account associated with a client portal provided by the client portal server;
    in response to receiving the request to authenticate the first user to the first user account associated with the client portal provided by the client portal server:
      generating, by the at least one processor, a first device selection prompt directing the client portal server to prompt the first user to select at least two devices to receive one-time passcodes;
      sending, by the at least one processor, via the communication interface, and to the client portal server, the first device selection prompt directing the client portal server to prompt the first user to select the at least two devices to receive the one-time passcodes;
    receiving, by the at least one processor, via the communication interface, and from the client portal server, first device selection input selecting a first registered device and a second registered device to receive the one-time passcodes;
    generating, by the at least one processor, a first one-time passcode for the first registered device and a second one-time passcode for the second registered device;
    sending, by the at least one processor, via the communication interface, the first one-time passcode to the first registered device and the second one-time passcode to the second registered device;
    receiving, by the at least one processor, via the communication interface, and from the client portal server, first one-time passcode input;
    validating, by the at least one processor, the first one-time passcode input received from the client portal server;
    based on validating the first one-time passcode input received from the client portal server, generating, by the at least one processor, a first validation message directing the client portal server to provide the first user with access to the first user account; and
    sending, by the at least one processor, via the communication interface, to the client portal server, the first validation message directing the client portal server to provide the first user with access to the first user account.

11. The method of claim 10, comprising:
  prior to receiving the request to authenticate the first user to the first user account associated with the client portal provided by the client portal server:

receiving, by the at least one processor, first device registration information for the first user account associated with the client portal provided by the client portal server; and storing, by the at least one processor, the first device registration information for the first user account associated with the client portal provided by the client portal server, wherein the first device registration information identifies the first registered device, the second registered device, and a third registered device as authorized passcode recipients for the first user account associated with the client portal provided by the client portal server.

12. The method of claim 10, wherein prior to generating the first validation message directing the client portal server to provide the first user with access to the first user account, the computing platform receives input selecting a third registered device associated with the first user account to receive an authentication prompt, and the computing platform generates and sends a registered-device authentication prompt to the third registered device associated with the first user account.

13. The method of claim 12, wherein the registered-device authentication prompt generated and sent to the third registered device associated with the first user account comprises a biometric authentication prompt.

14. The method of claim 10, comprising:
receiving, by the at least one processor, via the communication interface, and from the client portal server, a request to authenticate a second user to a second user account associated with the client portal provided by the client portal server;

receiving, by the at least one processor, via the communication interface, and from the client portal server, second device selection input selecting a third registered device and a fourth registered device to receive one-time passcodes;

generating, by the at least one processor, a third one-time passcode for the third registered device and a fourth one-time passcode for the fourth registered device;

sending, by the at least one processor, via the communication interface, the third one-time passcode to the third registered device and the fourth one-time passcode to the fourth registered device;

receiving, by the at least one processor, via the communication interface, and from the client portal server, second one-time passcode input;

validating, by the at least one processor, the second one-time passcode input received from the client portal server;

based on validating the second one-time passcode input received from the client portal server, generating, by the at least one processor, a second validation message directing the client portal server to provide the second user with access to the second user account; and sending, by the at least one processor, via the communication interface, to the client portal server, the second validation message directing the client portal server to provide the second user with access to the second user account.

15. The method of claim 14, comprising:
prior to receiving the request to authenticate the second user to the second user account associated with the client portal provided by the client portal server:

receiving, by the at least one processor, second device registration information for the second user account associated with the client portal provided by the client portal server; and storing, by the at least one processor, the second device registration information for the second user account associated with the client portal provided by the client portal server, wherein the second device registration information identifies the third registered device, the fourth registered device, and a fifth registered device as authorized passcode recipients for the second user account associated with the client portal provided by the client portal server.

16. The method of claim 14, comprising:
in response to receiving the request to authenticate the second user to the second user account associated with the client portal provided by the client portal server:

generating, by the at least one processor, a second device selection prompt directing the client portal server to prompt the second user to select at least two devices to receive the one-time passcodes; and sending, by the at least one processor, via the communication interface, and to the client portal server, the second device selection prompt directing the client portal server to prompt the second user to select the at least two devices to receive the one-time passcodes.

17. The method of claim 16, wherein prior to generating the second validation message directing the client portal server to provide the second user with access to the second user account, the computing platform receives input selecting a fifth registered device associated with the second user account to receive an authentication prompt, and the computing platform generates and sends a registered-device authentication prompt to the fifth registered device associated with the second user account.

18. One or more non-transitory computer-readable media storing instructions that, when executed by a computing platform comprising at least one processor, memory, and a communication interface, cause the computing platform to:

receive, via the communication interface, and from a client portal server, a request to authenticate a first user to a first user account associated with a client portal provided by the client portal server;

in response to receiving the request to authenticate the first user to the first user account associated with the client portal provided by the client portal server:

generate a first device selection prompt directing the client portal server to prompt the first user to select at least two devices to receive one-time passcodes;

send, via the communication interface, and to the client portal server, the first device selection prompt directing the client portal server to prompt the first user to select the at least two devices to receive the one-time passcodes;

receive, via the communication interface, and from the client portal server, first device selection input selecting a first registered device and a second registered device to receive the one-time passcodes;

generate a first one-time passcode for the first registered device and a second one-time passcode for the second registered device;

send, via the communication interface, the first one-time passcode to the first registered device and the second one-time passcode to the second registered device;

receive, via the communication interface, and from the client portal server, first one-time passcode input;
validate the first one-time passcode input received from the client portal server;
based on validating the first one-time passcode input received from the client portal server, generate a first validation message directing the client portal server to provide the first user with access to the first user account; and
send, via the communication interface, to the client portal server, the first validation message directing the client portal server to provide the first user with access to the first user account.

\* \* \* \* \*